Patented Dec. 25, 1951

2,579,492

UNITED STATES PATENT OFFICE 2,579,492

VULCANIZATION OF POLYMERIZED ACRYLIC ESTERS

John E. Hansen, North Wales, and Thomas J. Dietz, Philadelphia, Pa., assignors to the United States of America as represented by the Secretary of Agriculture No Drawing. Application July 19, 1949,
Serial No. 105,662

10 Claims. (Cl. 260—23)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to synthetic rubbers, particularly to synthetic rubbers produced from alkyl acrylate polymers and copolymers, and has among its objects the production of vulcanized alkyl acrylate polymers having enhanced rubberlike properties and capable of being used in place of rubber. Other objects and advantages of the invention will be apparent from the description of the invention.

It is well known that synthetic rubbers can be produced by vulcanization or curing of various polymeric substances. As in the treatment of natural rubber, vulcanization or curing of these synthetic polymers is a process whereby a thermoplastic, solvent-soluble substance of limited elasticity and high plastic flow is converted into an elastic, insoluble material, substantially free of plastic flow and relatively insensitive to temperature variations.

Vulcanization does not occur on heating polymeric alkyl acrylates with sulfur, and the products obtained by heating these polymers in admixture with sulfur, carbon black and standard vulcanization accelerators commonly used in the natural and synthetic rubber industries lack many desirable characteristics of natural and synthetic rubber vulcanizates.

We have found that vulcanized synthetic rubbers can be obtained by heating an alkyl acrylate polymer at vulcanization temperature in the presence of an amine selected from the group consisting of an unsubstituted polymethylenediamine and an unsubstituted polyethyleneamine, or of a mixture of such amines, as the sole curing or vulcanizing agent. We have further found that this vulcanization process is catalyzed by saturated fatty acids and occurs more readily if, prior to vulcanization, the alkyl acrylate polymer is subjected to vigorous mechanical kneading, with application of heat, in the presence of the amine and the fatty acid.

The vulcanization process of this invention is applicable to the curing of alkyl acrylate polymers formed by polymerization of monomeric alkyl esters of acrylic acid, free of substituents in either the alkyl group or the acrylic acid radical, and containing up to 8 carbon atoms in the alkyl group, and is especially well adapted to the production of vulcanizates from polymers of such alkyl acrylates, wherein the alkyl group is a lower alkyl group, that is, contains not more than 5 carbon atoms. Although the process yields the most satisfactory results when applied to polymers and copolymers formed by polymerization of the aforesaid alkyl esters of acrylic acid, singly or in combination, it is also useful in the curing of certain copolymers which do not yield vulcanized products by curing methods utilized heretofore. Such copolymers include for example the polymeric products formed by conjoint polymerization of monomer mixtures containing at least about 10 percent by weight on the basis of the polymerizable components of the above-specified alkyl esters of acrylic acid, admixed with alkyl esters of methacrylic acid, styrene, and other polymerizable unsaturated compounds which do not contain a plurality of olefinic linkages, an arylacrylic or methacrylic group, halogen, or a nitro, cyano or ketone group. Such suitable copolymers include, for instance, the copolymers of alkyl acrylates with vinyl esters of saturated fatty acids.

The alkyl acrylate polymers and copolymers adapted for use in the process of our invention may be produced by any conventional polymerization method. The amines suitable as vulcanizing or curing agents in our process are the polymethylenediamines and polyethyleneamines, as for instance, ethylenediamine, diethylenetriamine, triethylenetetramine, tetraethylenepentamine, hexamethylenediamine, and the like.

Saturated fatty acids which can be used to catalyze the vulcanization process are the relatively non-volatile higher fatty acids such as caprylic, lauric, myristic, palmitic and stearic acid, and in general, saturated fatty acids containing from 8 to 18 carbon atoms.

According to the method of this invention, a mixture of alkyl acrylate polymer or copolymer with a sufficient amount of the amine used as vulcanizing agent, preferably about 0.5 to 5.0 parts by weight of amine per 100 parts polymeric material, and which preferably also contains from about 0.5 to 4.0 parts by weight of the saturated fatty acid catalyst per 100 parts polymeric material, and which may also include carbon black and other conventional rubber compounding ingredients, inert fillers, pigments, etc., is first milled on rubber compounding rolls, preferably at a temperature within the range of about 100° to 200° F., and is then vulcanized in accordance with methods commonly utilized in the production of natural and synthetic rubber vulcanizates. The following examples, shown in tabulated form hereinafter, are given as illustrative embodiments of a manner in which our invention may be carried out in practice. All parts are by weight.

The effect of various compounding ingredients on the rate of cure of alkyl acrylate polymers was determined by means of the scorch test using a Mooney viscometer (essentially following the procedure described by Weaver 1940, Rubber Age 48, 89). The polymer was mixed with SRF black and stearic acid as a master batch in a Banbury mixer. Other ingredients were added on a 6" x 12" laboratory mill, and the milling was continued according to ASTM procedure D15-41. The stock was then refined and sheeted off at a finished thickness of about ⅛ inch. Discs of the requisite size to fit the Mooney viscometer were cut from the compounded sheet with the aid of a die. Usually about six discs, 35 grams, in all were required to fill the cavity. The discs were placed in the viscometer, which was controlled at 300° ±3° F. for a one minute preheat and then the rotor was set in motion. Dial readings were taken every minute for thiry minutes.

The tensile properties of the various vulcanizates were determined by the usual ASTM procedure, D413-41, using dumb-bells stamped from slabs which had been cured at 298° F. in standard molds (ASTM D15-41). Swelling measurements were determined on 1" x 1½" rectangles cut from the same sheet as the tensile dumb-bells. All swelling measurements were done in boiling water.

The aging data were obtained on standard dumb-bells which had been hung in a mechanical convection oven at 300° F. for various lengths of time.

In the experimental data thus obtained and shown below Examples I through VIII illustrate the effect of amine, stearic acid, sulfur and milling temperature on the curing characteristics of ethyl polyacrylate, as evaluated by means of the Mooney viscometer according to the method of Shearer, Juve and Musch, India Rubber World 117, 216 (1947) and 117, 491 (1948).

Table A

| Example | I | II | III | IV | V | VI | VII | VIII |
|---|---|---|---|---|---|---|---|---|
| Ingredients of Recipe (Pts.): | | | | | | | | |
| Ethyl polyacrylate | 100 | 100 | 100 | 100 | 100 | 100 | 100 | 100 |
| Stearic acid | 1 | | 1 | 1 | 1 | 1 | 3 | 1 |
| Triethylenetetramine | | 2 | 2 | 2 | 2 | 3 | 2 | 2 |
| Sulfur | | | | | | | | 2 |
| SRF Black | 70 | 70 | 70 | 70 | 70 | 70 | 70 | 70 |
| Milling temperature, °F | 150 | 150 | 150 | 50 | 200 | 150 | 150 | 150 |
| Curing characteristics at 300° F.: | | | | | | | | |
| Scorch time: (Ts), min.[1] | >20 | 13 | 4 | 6 | 4 | 3 | 3 | 8 |
| Viscosity at Ts, (Vm)[2] | 37.0 | 29.9 | 27.9 | 10.0 | 33.2 | 35.1 | 32.1 | 32.1 |
| Cure time (Tc), min.[3] | No | >>30 | 13.8 | 26.3 | 12.0 | 12.6 | 10.4 | 23.0 |

[1] Time required to reach scorch point (uncorrected for initial changes in specimen temperature).
[2] Viscosity of specimen at scorch point in dial units.
[3] Time required to reach cure point (20 points above minimum viscosity).

The following Examples IX through XIII show the effect of various amines on the curing characteristics of ethyl polyacrylate. The curing characteristics are evaluated as in Table A.

Table B

| Example | IX | X | XI | XII | XIII |
|---|---|---|---|---|---|
| Ingredients of Recipe (Pts.): | | | | | |
| Ethyl polyacrylate | 100 | 100 | 100 | 100 | 100 |
| Stearic acid | 1 | 1 | 1 | 1 | 1 |
| Diethylene triamine | 2 | | | | |
| Triethylene tetramine | | 2 | | | |
| Tetraethylene pentamine | | | 2 | | |
| Ethylene diamine | | | | 2 | |
| Hexamethylene diamine | | | | | 2 |
| SRF black | 70 | 70 | 70 | 70 | 70 |
| Milling temperature °F | 150 | 150 | 150 | 150 | 150 |
| Curing characteristics at 300° F.: | | | | | |
| Ts min | 5 | 3 | 6 | 8 | 8 |
| Vm | 32.9 | 32.1 | 28.0 | 28.3 | 27.9 |
| Tc min | 24.1 | 10.4 | 15.2 | [1]31.5 | 23.5 |

[1] Extrapolated value.

The following Examples XIV through XVII show the effect of various fatty acids on the curing characteristics of ethyl polyacrylate. These characteristics are evaluated as in Table A.

Table C

| Example | XIV | XV | XVI | XVII |
|---|---|---|---|---|
| Ingredients of Recipe (Pts.): | | | | |
| Ethyl polyacrylate | 100 | 100 | 100 | 100 |
| Lauric acid | 1 | | | |
| Myristic acid | | 1 | | |
| Palmitic acid | | | 1 | |
| Stearic acid | | | | 1 |
| Triethylene tetramine | 2 | 2 | 2 | 2 |
| SRF black | 50 | 50 | 50 | 50 |
| Milling temperature °F | 150 | 150 | 150 | 150 |
| Curing characteristics at 300° F.: | | | | |
| Ts min | 4 | 3 | 6 | 3 |
| Vm | 29.2 | 29.3 | 30.0 | 30.1 |
| Tc min | 21.0 | 27.6 | 27.1 | 33 |

The following Examples XVIII through XXII show the effectiveness of triethylene tetramine in curing various alkyl acrylate polymers and copolymers. The curing characteristics are evaluated as in Table A.

Table D

| Example | XVIII | XIX | XX | XXI | XXII |
|---|---|---|---|---|---|
| Ingredients of Recipe (Pts.): | | | | | |
| Methyl polyacrylate | 100 | | | | |
| Ethyl polyacrylate | | 100 | | | |
| Butyl polyacrylate | | | 100 | | |
| Copolymer of ethyl acrylate and methyl methacrylate | | | | 100 | |
| Ethyl polyacrylate styrene [1] | | | | | 100 |
| Stearic acid | 1 | 1 | 1 | 1 | 1 |
| Triethylene tetramine | 2 | 2 | 2 | 2 | 2 |
| SRF black | 50 | 50 | 50 | 50 | 50 |
| Milling temperatures °F | 150 | 150 | 150 | 150 | 150 |
| Curing characteristics at 300° F.: | | | | | |
| Ts minutes | 3 | 3 | 10 | 3 | 8 |
| Vm | 35.0 | 30.1 | 6.0 | 9.1 | 16.4 |
| Tc minutes | [2]6.1 | [3]33 | [3]37 | 8.1 | [3]37 |

[1] A copolymer of 20% styrene and 80% ethyl acrylate.
[2] Interpolated value.
[3] Extrapolated values.

The following Examples XXIII through XXV show some of the physical properties of ethyl polyacrylate vulcanizates.

Table E

| Example | XXIII | XXIV | XXV |
|---|---|---|---|
| Ingredients of Recipe (Pts.): | | | |
| Ethyl polyacrylate | 100 | 100 | 100 |
| Stearic acid | 1 | 3 | 3 |
| Triethylene tetramine | 2 | 1 | 2 |
| SRF black | 50 | 50 | 50 |
| Curing time at 298° F minutes | 60 | 60 | 60 |
| Unaged Properties: | | | |
| Tensile strength, p. s. i | 1540 | 1490 | 1500 |
| Ultimate elongation per cent | 590 | 790 | 530 |
| Modulus at 200%, p. s. i | 340 | 220 | 420 |
| Durometer hardness, 30 sec | 38 | 39 | 45 |
| Brittle point °C | −15 | −15 | −15 |
| Volume increase in 48 hrs. in water at 212° F per cent | 21 | 21 | 17 |
| Aged, 300° F/3 days: | | | |
| Tensile strength, p. s. i | 1130 | 830 | 1210 |
| Ultimate elongation per cent | 180 | 480 | 180 |
| Modulus at 200%, p. s. i | | 280 | |
| Durometer hardness, 30 sec | 56 | 49 | 60 |

Essentially analogous results are obtained when the ethyl polyacrylate of Examples I through XVII, XIX, and XXIII through XXV is replaced by any of the polymeric materials used in Examples XVII and XX; using any of the amines of Examples IX, XI through XIII in lieu of triethylenetetramine in Examples II through VIII, X, and XIV through XXV; and replacing in Examples I, III through XIII, and XVII through XXV the stearic acid by any of the fatty acids used in Examples XIV through XVI.

We claim:

1. A process comprising heating a mixture containing an amine selected from the group consisting of an unsubstituted polymethylenediamine, an unsubstituted polyethyleneamine, and a mixture of these amines as the sole vulcanizing agent, and a halogen-free polymeric material selected from the group consisting of polymeric alkyl acrylate, a copolymer of an alkyl acrylate and an alkyl methacrylate, and a copolymer of an alkyl acrylate and styrene, at vulcanization temperature to effect vulcanization of said polymeric material.

2. A process comprising heating a mixture containing an amine selected from the group consisting of an unsubstituted polymethylenediamine, an unsubstituted polyethyleneamine, and a mixture of these amines as the sole vulcanizing agent, a saturated higher fatty acid containing from 8 to 18 carbon atoms as a catalyst, and a halogen-free polymeric material selected from the group consisting of polymeric alkyl acrylate, a copolymer of an alkyl acrylate and an alkyl methacrylate, and a copolymer of an alkyl acrylate and styrene, at vulcanization temperature to effect vulcanization of said polymeric material.

3. A process comprising heating a mixture containing an amine selected from the group consisting of an unsubstituted polymethylenediamine, an unsubstituted polyethyleneamine, and a mixture of these amines as the sole vulcanizing agent, a saturated higher fatty acid containing from 8 to 18 carbon atoms as a catalyst, and a halogen-free polymeric material selected from the group consisting of polymeric alkyl acrylate, a copolymer of an alkyl acrylate and an alkyl methacrylate, and a copolymer of an alkyl acrylate and styrene, at vulcanization temperature to effect vulcanization of said polymeric material, said amine and acid being present in the mixture in the amounts, by weight, of about from 0.5 to 5.0 parts of the amine and about from 0.5 to 4 parts of the acid per 100 parts of the polymeric material.

4. The process of claim 3 wherein the alkyl group of the polymeric alkyl acrylate contains up to 8 carbon atoms.

5. The process of claim 3 wherein the amine is a polymethylenediamine.

6. The process of claim 3 wherein the amine is a polyethyleneamine.

7. The process of claim 3 wherein the acid is stearic acid.

8. A process comprising heating a mixture containing triethylenetetramine as the sole vulcanizing agent, stearic acid as a catalyst, and ethyl polyacrylate, at vulcanization temperature to effect vulcanization of said polyacrylate, said amine and acid being present in the mixture in the amounts of about from 0.5 to 5.0 parts of the amine and about from 0.5 to 4 parts of the acid per 100 parts of the polyacrylate.

9. The vulcanizate resulting from the process of claim 1.

10. The vulcanizate resulting from the process of claim 8.

JOHN E. HANSEN.
THOMAS J. DIETZ.

REFERENCES CITED

The following references are of record in the file of this patent:

UNITED STATES PATENTS

| Number | Name | Date |
|---|---|---|
| 2,451,174 | Reuter | Oct. 12, 1948 |